US012249776B2

(12) United States Patent
Liu et al.

(10) Patent No.: US 12,249,776 B2
(45) Date of Patent: Mar. 11, 2025

(54) COMPOSITE ANTENNA AND ELECTRONIC DEVICE

(71) Applicant: Universal Global Technology (Kunshan) Co., Ltd., Jiangsu Province (CN)

(72) Inventors: Shang Hao Liu, Jiangsu Province (CN); Yu Sheng Su, Jiangsu Province (CN); Hung Wei Chiu, Jiangsu Province (CN); Jui Chih Chien, Jiangsu Province (CN)

(73) Assignee: Universal Global Technology (Kunshan) Co., Ltd., Jiangsu Province (CN)

( * ) Notice: Subject to any disclaimer, the term of this patent is extended or adjusted under 35 U.S.C. 154(b) by 245 days.

(21) Appl. No.: 18/184,648

(22) Filed: Mar. 15, 2023

(65) Prior Publication Data

US 2024/0222868 A1 Jul. 4, 2024

(30) Foreign Application Priority Data

Dec. 29, 2022 (CN) ......................... 202211726830.3

(51) Int. Cl.
*H01Q 3/22* (2006.01)
*H01Q 9/04* (2006.01)

(52) U.S. Cl.
CPC ............. *H01Q 9/0414* (2013.01); *H01Q 3/22* (2013.01)

(58) Field of Classification Search
CPC .......... H01Q 1/12; H01Q 1/20; H01Q 1/2266; H01Q 1/243; H01Q 1/36; H01Q 1/38; H01Q 1/48; H01Q 1/50; H01Q 3/22; H01Q 7/00; H01Q 9/0414; H01Q 9/265; H01Q 9/285; H01Q 1/46; H01Q 5/00
See application file for complete search history.

(56) References Cited

U.S. PATENT DOCUMENTS 6,943,738 B1 * 9/2005 Mattsson ............... H01Q 1/243 343/700 MS
2010/0255893 A1 10/2010 Ihara et al.

FOREIGN PATENT DOCUMENTS

CN 103531882 B 8/2016
TW M571054 U 12/2018

* cited by examiner

*Primary Examiner* — Henry Luong
(74) *Attorney, Agent, or Firm* — CKC & Partners Co., LLC

(57) ABSTRACT

A composite antenna and an electronic device are proposed. The electronic device includes the composite antenna, and the composite antenna includes a substrate, a first antenna structure, two contact springs, an antenna holder and a second antenna structure. The first antenna structure is disposed on the substrate, and two ends of the first antenna structure are coupled to a feeding point and a grounding point, respectively. The two contact springs are disposed on the first antenna structure, and electrically connected to the feeding point and the grounding point, respectively. The antenna holder is removably disposed on the substrate. The second antenna structure is disposed on the antenna holder and electrically connected to the two contact springs.

18 Claims, 9 Drawing Sheets

COMPOSITE ANTENNA AND ELECTRONIC DEVICE

RELATED APPLICATIONS

This application claims priority to China Patent Application Serial Number 202211726830.3, filed Dec. 29, 2022, which is herein incorporated by reference.

BACKGROUND

Technical Field

The present disclosure relates to a composite antenna and an electronic device. More particularly, the present disclosure relates to a composite antenna and an electronic device combining two antenna structures by disposing an antenna bracket on a substrate.

Description of Related Art

With the rapid development of wireless communication technology, the number of antennas required in mobile communication devices (such as notebook, tablet and mobile phone) is increasing. In addition, most of the current mobile communication devices use screens with narrow borders, and are developing toward the trend of miniaturization. However, under the trend of miniaturization, the hardware space of the mobile communication device is severely compressed. Correspondingly, the clearance area for disposing the antenna in the mobile communication device is becoming more and more limited.

Thus, it can be seen that there is a lack of a composite antenna and electronic device in the current market, which can expand multiple antennas in a limited antenna clearance area and still maintain high antenna efficiency, so relevant industries are looking for solutions.

SUMMARY

According to one aspect of the present disclosure, a composite antenna includes a substrate, a first antenna structure, two contact springs, an antenna holder and a second antenna structure. The first antenna structure is disposed on the substrate, and two ends of the first antenna structure are coupled to a feeding point and a grounding point, respectively. The two contact springs are disposed on the first antenna structure, and electrically connected to the feeding point and the grounding point, respectively. The antenna holder is removably disposed on the substrate. The second antenna structure is disposed on the antenna holder and electrically connected to the two contact springs.

According to another aspect of the present disclosure, an electronic device includes at least one of the composite antenna of any one of the aforementioned aspects.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
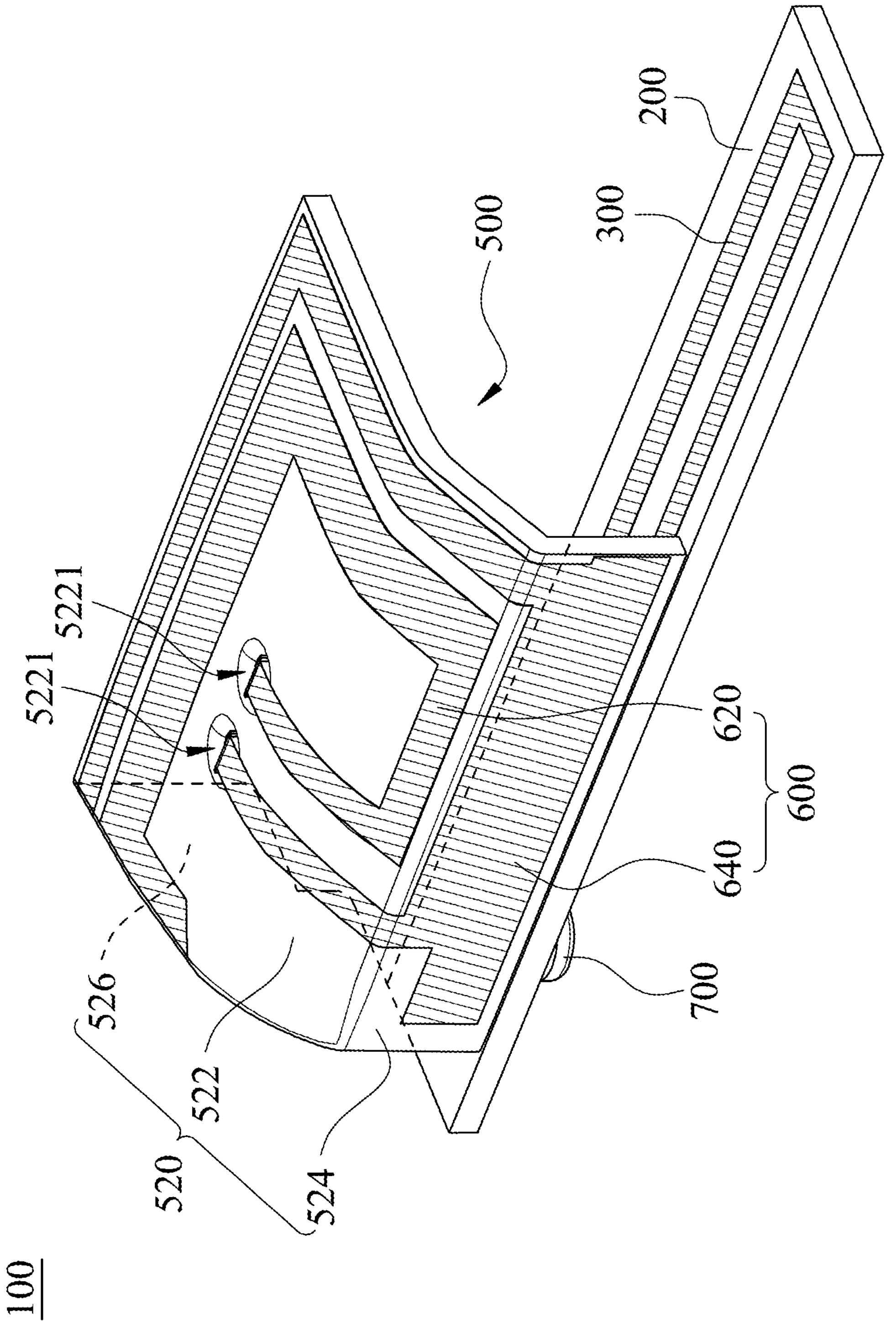
FIG. 1 shows a three-dimensional schematic view of a composite antenna according to a first embodiment of the present disclosure.
Figure 2:
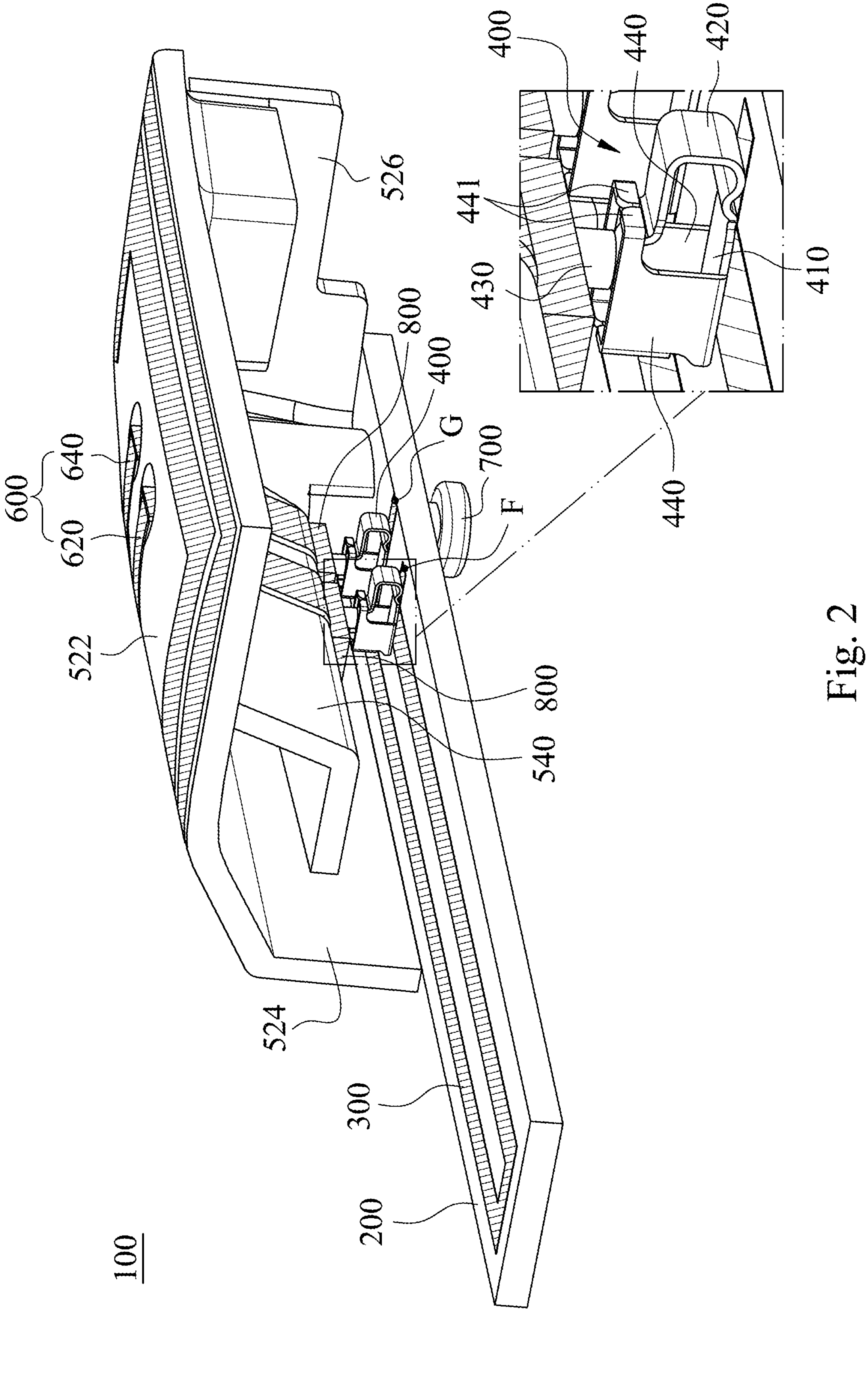
FIG. 2 shows another three-dimensional schematic view of the composite antenna of FIG. 1.

Please refer to FIGS. 1 and 2. FIG. 1 shows a three-dimensional schematic view of a composite antenna 100 according to a first embodiment of the present disclosure. FIG. 2 shows another three-dimensional schematic view of the composite antenna 100 of FIG. 1. As shown in FIGS. 1 and 2, the composite antenna 100 includes a substrate 200, a first antenna structure 300, two contact springs 400, an antenna holder 500 and a second antenna structure 600.

The substrate 200 can be a planar substrate, for example, a system mainboard, a printed circuit board (PCB), a Flame Retardant 4 (FR4) substrate or a flexible printed circuit board (FPCB) in communication equipment or electronic devices. The thickness of the substrate 200 can be 0.9 mm, and the area of the substrate 200 (i.e., the area of the antenna clearance area) can be 6 mm*40 mm. The first antenna structure 300 is disposed on the substrate 200, and made of metal material, such as copper, silver, aluminum, iron, or alloy of the aforementioned metals. In addition, the first antenna structure 300 can be electroplated and/or 3D printed on the surface of the substrate 200. Two ends of the first antenna structure 300 are coupled to a feeding point F and a grounding point G, respectively. The feeding point F can be coupled to a signal source like a radio frequency (RF) module, and the signal source can be used to excite the first antenna structure 300, so that the first antenna structure 300 operates in a first frequency band. The grounding point G can extend to the outside of the substrate 200 and be coupled to a ground voltage, and the ground voltage can be provided by a system ground plane of the composite antenna 100.

The contact springs 400 are disposed on the first antenna structure 300, and electrically connected to the feeding point F and the grounding point G, respectively. The antenna holder 500 is removably disposed on the substrate 200. The second antenna structure 600 is disposed on the antenna holder 500 and can include a first radiator 620 and a second radiator 640, which are electrically connected to the contact springs 400, respectively. In particular, the antenna holder 500 can have a groove (not shown), which is configured to accommodate a nut (not shown). The composite antenna 100 can further include a positioning element 700 passing through the substrate 200 and locking the aforementioned nut so as to position the antenna holder 500 to the substrate 200. The first radiator 620 and the second radiator 640 of the second antenna structure 600 can be made of metal material, such as copper, silver, aluminum, iron, or alloy of the aforementioned metals, and manufactured in the antenna holder 500 by using laser direct structuring (LDS). It should be noted that in the second antenna structure 600, the first radiator 620 can be electrically connected to the feeding point F through one of the contact springs 400, and the second radiator 640 can be electrically connected to the grounding point G through the other one of the contact springs 400. The first radiator 620 is excited by the feeding point F to operate in a second frequency band, and the second radiator 640 is coupled to the first radiator 620 to operate in a third frequency band and a fourth frequency band. It has to be noted that the composite antenna 100 of the present disclosure is not limited to sizes, materials, manufacturing methods of the abovementioned elements and the connection relationship with environmental elements.

Thus, the composite antenna 100 of the present disclosure arranges the contact springs 400 and the antenna holder 500 on the substrate 200, and uses the contact springs 400 to electrically connect the second antenna structure 600 disposed on the antenna holder 500 to the feeding point F and the grounding point G, so that the second antenna structure 600 and the first antenna structure 300 disposed on the substrate 200 can share the same antenna clearance area; in other words, the second antenna structure 600 is not located on a horizontal plane of the substrate 200, and located on one side of the substrate 200 instead. Therefore, it can effectively save space and expand the antenna frequency band.

In detail, the antenna holder 500 can include a main frame body 520 and a sub-frame body 540. The main frame body 520 includes an outward convex arc portion 522, an extending portion 524 and a side portion 526. The outward convex arc portion 522 includes two through holes 5221. The extending portion 524 is connected to the outward convex arc portion 522 and formed in a planar shape, and the extending portion 524 is perpendicular to the substrate 200. The side portion 526 is connected to the outward convex arc portion 522 and the extending portion 524, and perpendicular to the substrate 200. The sub-frame body 540 is connected between the outward convex arc portion 522 and the extending portion 524, and located between the substrate 200 and the outward convex arc portion 522.

Further, the composite antenna 100 can further include two conductive elements 800. The conductive elements 800 are disposed on the sub-frame body 540. Two ends of the conductive elements 800 respectively pass through the through holes 5221 to be connected to the first radiator 620 and the second radiator 640 of the second antenna structure 600, and another two ends of the conductive elements 800 are abutted by two contact portions 430 of the contact springs 400, respectively. Furthermore, each of the contact springs 400 can be a connector with electrical conductivity, and is welded to the first antenna structure 300. Each of the contact springs 400 can include a bottom plate 410, an elastic supporting portion 420, the contact portion 430 and two side plates 440. The bottom plate 410 is disposed on the first antenna structure 300. The elastic supporting portion 420 is reversely bent from one end of the bottom plate 410 toward the other end of the bottom plate 410. The contact portion 430 is connected to the elastic supporting portion 420 and perpendicular to the bottom plate 410. The side plates 440 are disposed opposite to the bottom plate 410 and perpendicular to the bottom plate 410, and each of the side plates 440 can include a limiting portion 441. The limiting portions 441 of the side plates 440 are located above the elastic supporting portion 420 and configured to limit the elastic supporting portion 420 so as to prevent the antenna holder 500 from detaching from the substrate 200 or the sub-frame body 540 deformed due to excessive elastic force of the elastic supporting portion 420. In other embodiments, the contact springs can be soldered to the substrate and directly connected to the feeding point and the grounding point, respectively. Therefore, the contact springs of the present disclosure do not need to be completely disposed on the first antenna structure, and only need to be electrically connected to the feeding point and the grounding point.

Figure 3:
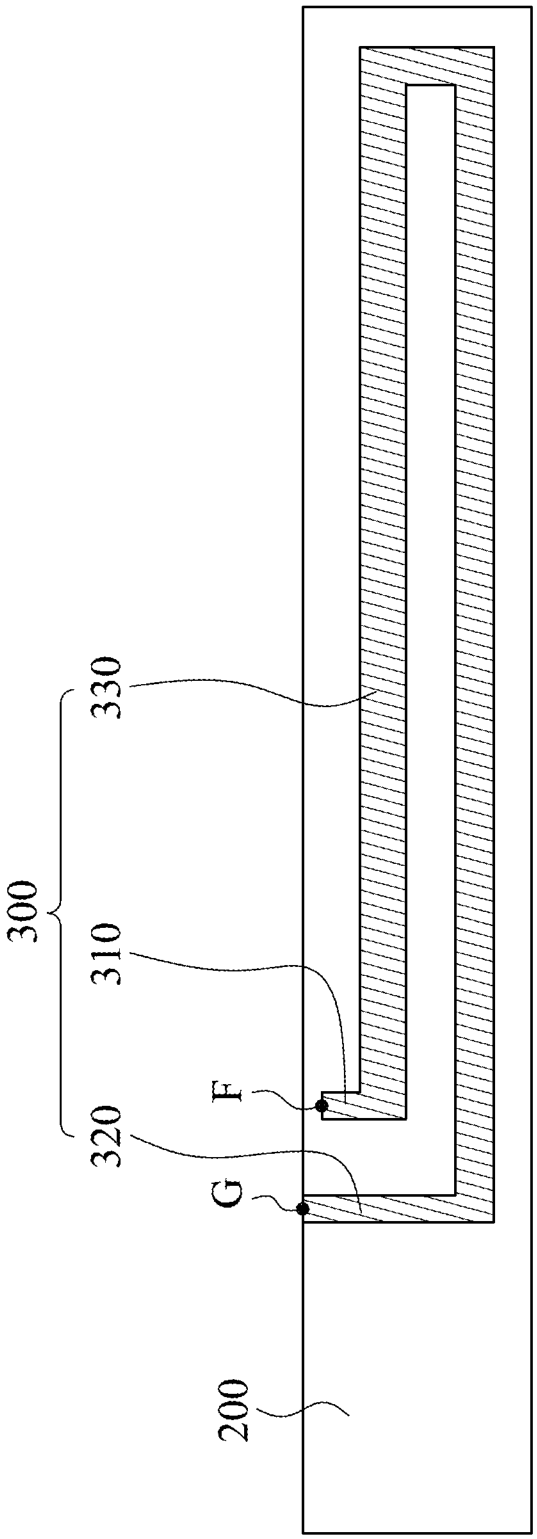
FIG. 3 shows a top view of a substrate and a first antenna structure of the composite antenna of FIG. 1.

Please refer to FIG. 3. FIG. 3 shows a top view of the substrate 200 and the first antenna structure 300 of the composite antenna 100 of FIG. 1. As shown in FIG. 3, the first antenna structure 300 can include a feeding portion 310, a grounding portion 320 and a radiating portion 330. The feeding portion 310 is electrically connected to the feeding point F. The grounding portion 320 is electrically connected to the grounding point G and parallel to the feeding portion 310, and the grounding portion 320 is spaced apart from the feeding portion 310. The radiating portion 330 is formed in a ring shape, and two ends of the radiating portion 330 are connected to the feeding portion 310 and the grounding portion 320, respectively. Further, the first antenna structure 300 can be a loop antenna, such as a GPS antenna, and the radiating portion 330 can cover the first frequency band, and a center frequency of the first frequency band is 1.575 GHz.

Figure 4:
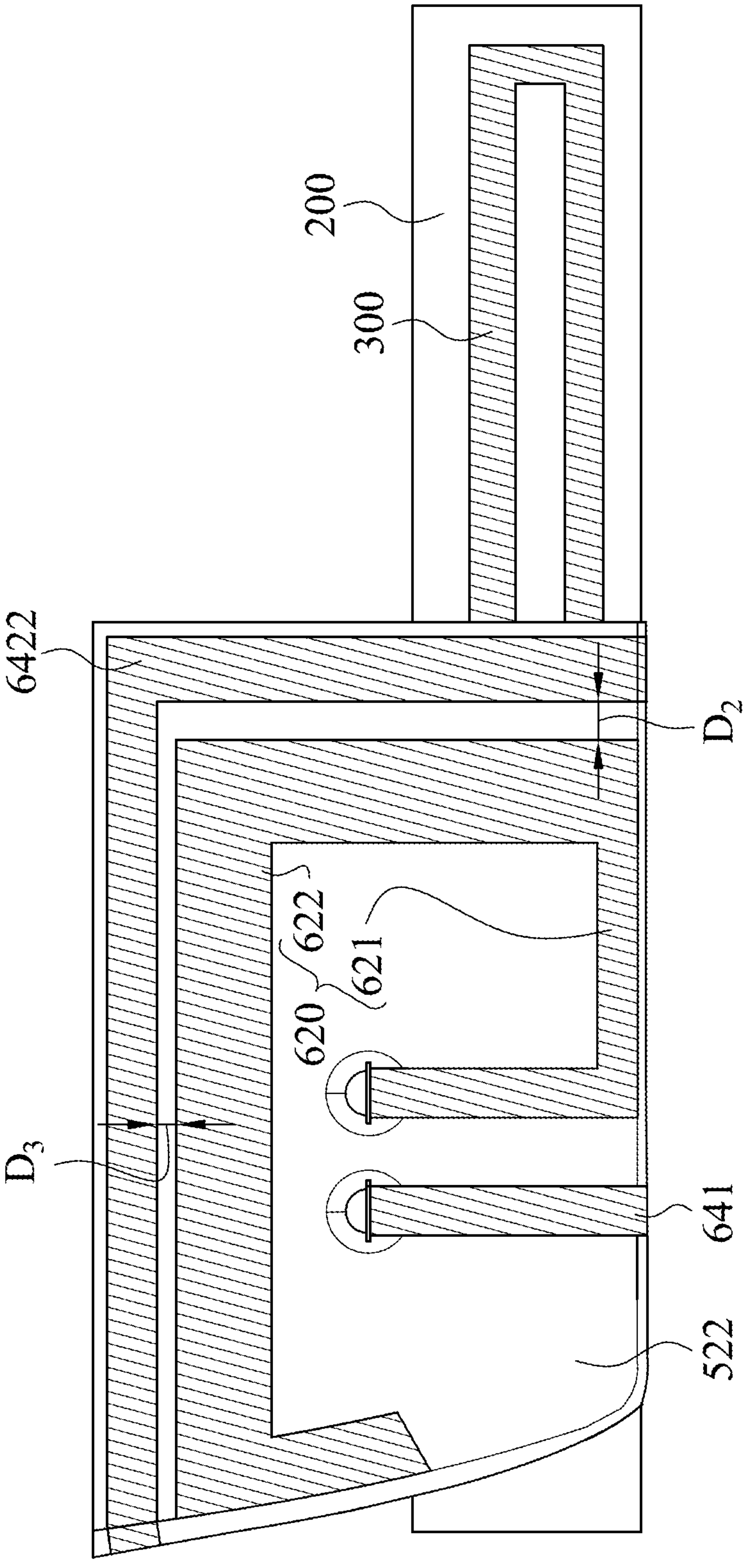
FIG. 4 shows a top view of the composite antenna of FIG. 1.
Figure 5:
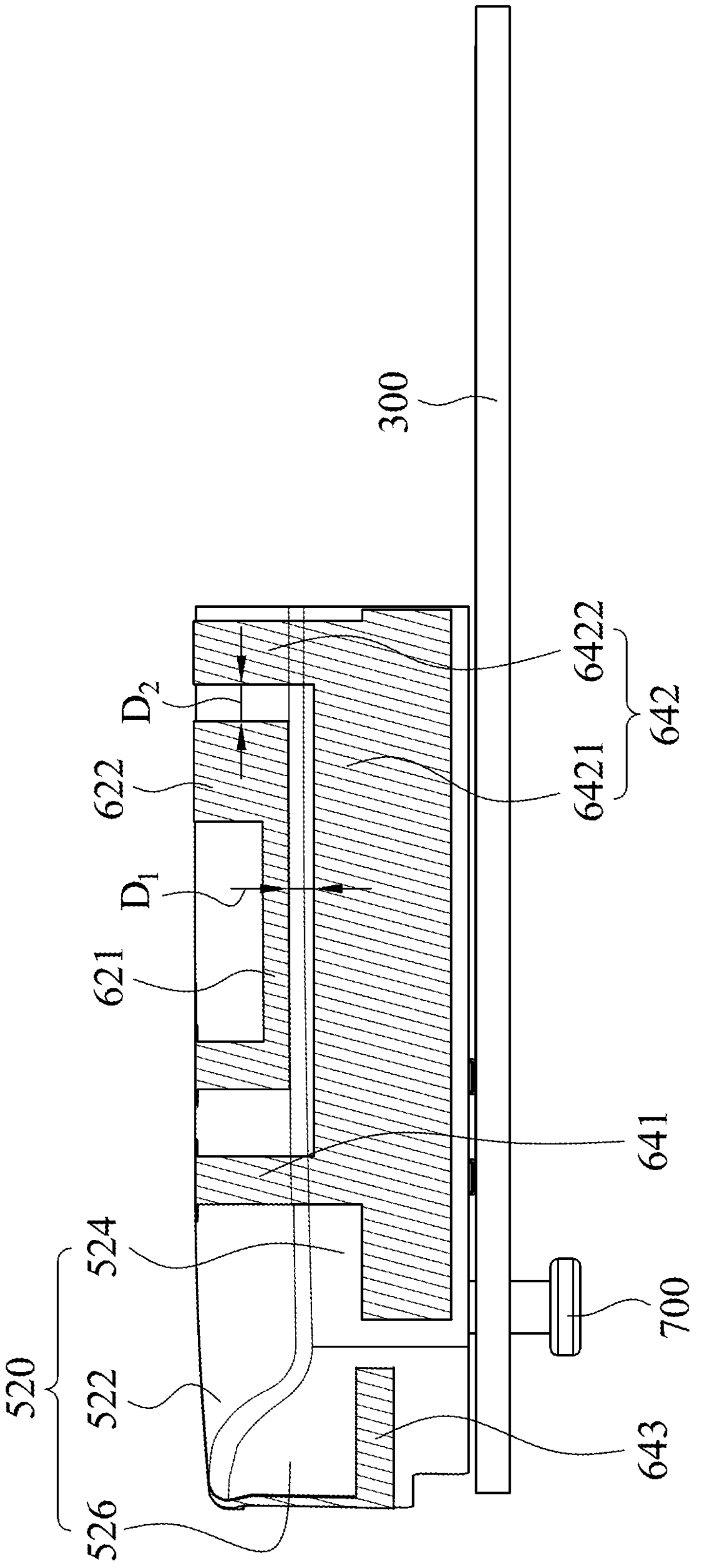
FIG. 5 shows a lateral view of the composite antenna of FIG. 1.
Figure 6:
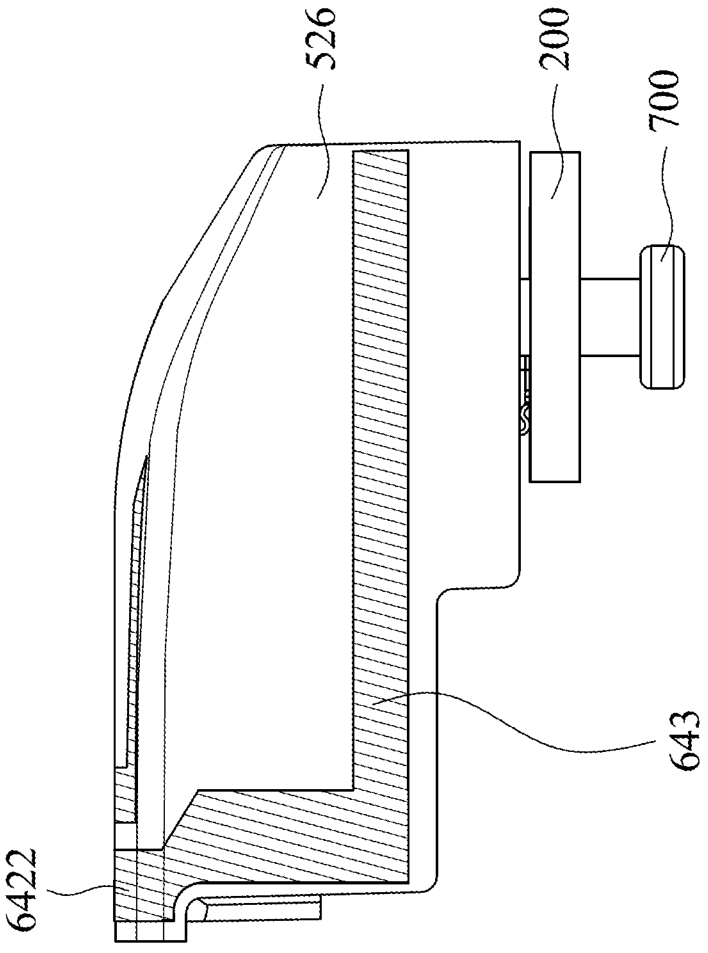
FIG. 6 shows another lateral view of the composite antenna of FIG. 1.

Please refer to FIGS. 1, 2, 4, 5 and 6. FIG. 4 shows a top view of the composite antenna 100 of FIG. 1. FIG. 5 shows a lateral view of the composite antenna 100 of FIG. 1. FIG. 6 shows another lateral view of the composite antenna 100 of FIG. 1. In particular, the second antenna structure 600 can be a dipole antenna, such as a WWAN Aux antenna. As shown in FIG. 4, the first radiator 620 of the second antenna structure 600 is disposed on the outward convex arc portion 522 of the main frame body 520, and can include an extended feeding portion 621 and a high-frequency resonance portion 622. One end of the extended feeding portion 621 is electrically connected to the feeding point F through the one of the contact springs 400 and one of the conductive elements 800. The high-frequency resonance portion 622 is connected to the other end of the extended feeding portion 621 and excited by the feeding point F to operate in the second frequency band. Viewing the first radiator 620 from the top view, the extended feeding portion 621 is formed in a L-shape, and the high-frequency resonance portion 622 is formed in a U-shape, but the present disclosure is not limited thereto.

In FIGS. 4 and 5, the second radiator 640 can include an extended grounding portion 641, an intermediate-frequency resonance portion 642 and a low-frequency resonance portion 643. The extended grounding portion 641 is disposed on the outward convex arc portion 522 of the main frame body 520, and one end of the extended grounding portion 641 is electrically connected to the grounding point G via the other one of the contact springs 400 and another one of the conductive elements 800. The intermediate-frequency resonance portion 642 includes a first segment 6421 and a second segment 6422. The first segment 6421 is disposed on the extending portion 524 of the main frame body 520 and connected to the other end of the extended grounding portion 641, and the first segment 6421 operates in the third frequency band by coupling with the first radiator 620. The second segment 6422 is disposed on the outward convex arc portion 522 of the main frame body 520, and one end of the second segment 6422 is connected to the first segment 6421. The first segment 6421 can be formed in a long rectangle, and the second segment 6422 can be formed in a L-shape from the top view, but the present disclosure is not limited thereto. As shown in FIG. 6, the low-frequency resonance portion 643 is disposed on the side portion 526 of the main frame body 520 and connected to the other end of the second segment 6422, and the low-frequency resonance portion 643 is coupled to the first radiator 620 to operate in the fourth frequency band. The second frequency band is between 2300 MHz and 2690 MHz, the third frequency band is between 1810 MHz and 2170 MHz, and the fourth frequency band is between 728 MHz and 960 MHz.

Further, a coupling interval $D_1$ is formed between the extended feeding portion 621 of the first radiator 620 and the first segment 6421 of the intermediate-frequency resonance portion 642 of the second radiator 640. A coupling interval $D_2$ and a coupling interval $D_3$ are formed between the high-frequency resonance portion 622 of the first radiator 620 and the second segment 6422 of the intermediate-frequency resonance portion 642 of the second radiator 640. The coupling interval $D_2$ is equal to the coupling interval $D_1$ and can be between 0.7 mm and 1.3 mm, and the coupling interval $D_3$ is smaller than the coupling interval $D_2$ and can be between 0.3 mm and 0.7 mm. Therefore, the composite antenna 100 of the present disclosure uses an inner branch (i.e., the first radiator 620) arranged on the antenna holder 500 to provide the high-frequency resonance and can fine-tune the second frequency band by adjusting the width of the high-frequency resonance portion 622; uses a branch located on a side of the antenna holder 500 close to the substrate 200 (i.e., the first segment 6421 of the intermediate-frequency resonance portion 642) to couple out the intermediate frequency and can fine-tune the resonant frequency point and the bandwidth by adjusting the size of the first segment 6421; and uses an outer branch located on another side of the antenna holder 500 near the substrate 200 (i.e., the low-frequency resonance portion 643) to provide the low-frequency resonance to achieve the function of transmitting multi-band wireless signals.

Figure 7:
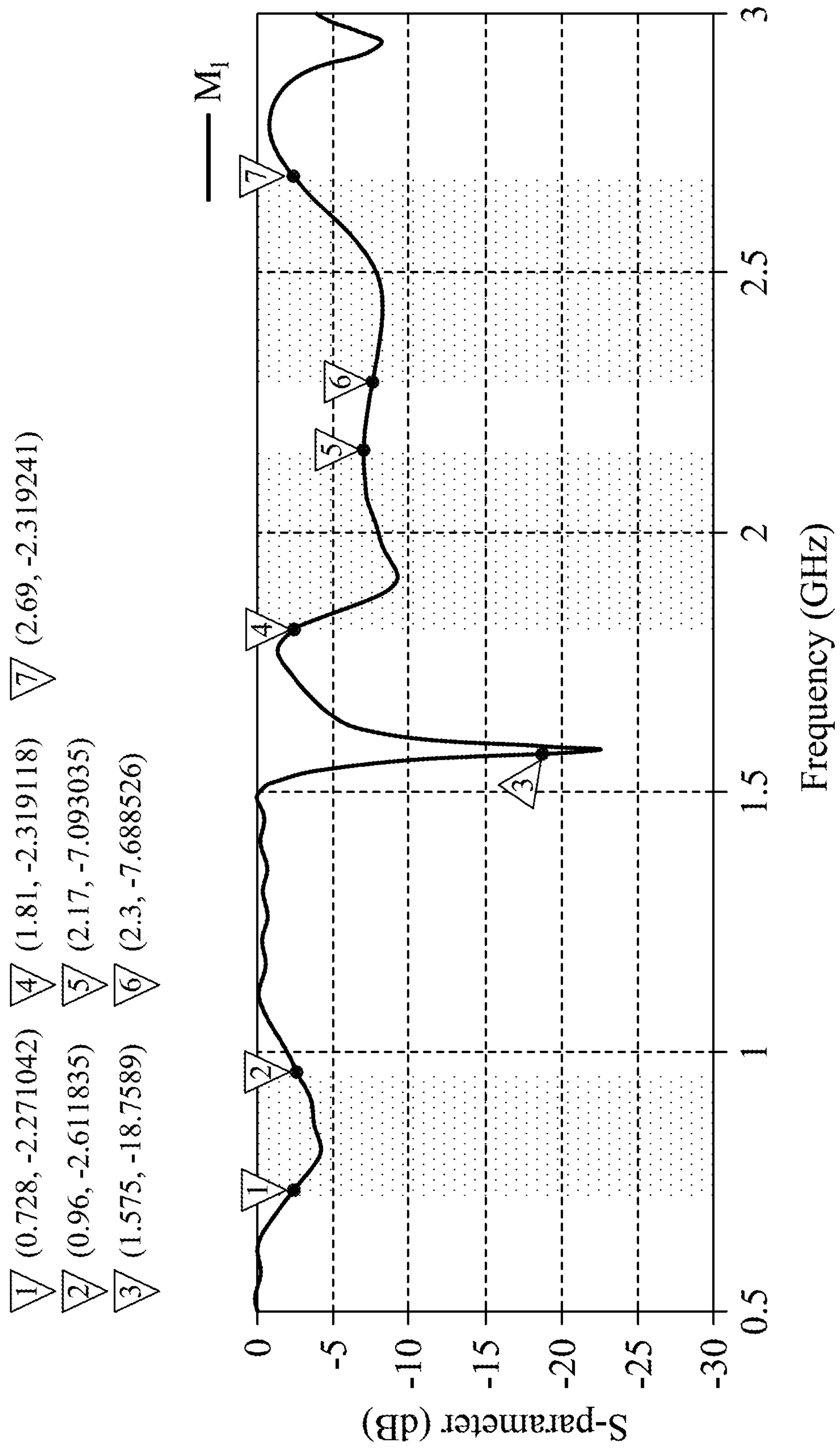
FIG. 7 shows a schematic graph illustrating S-parameter of the composite antenna of FIG. 1.
Figure 8:
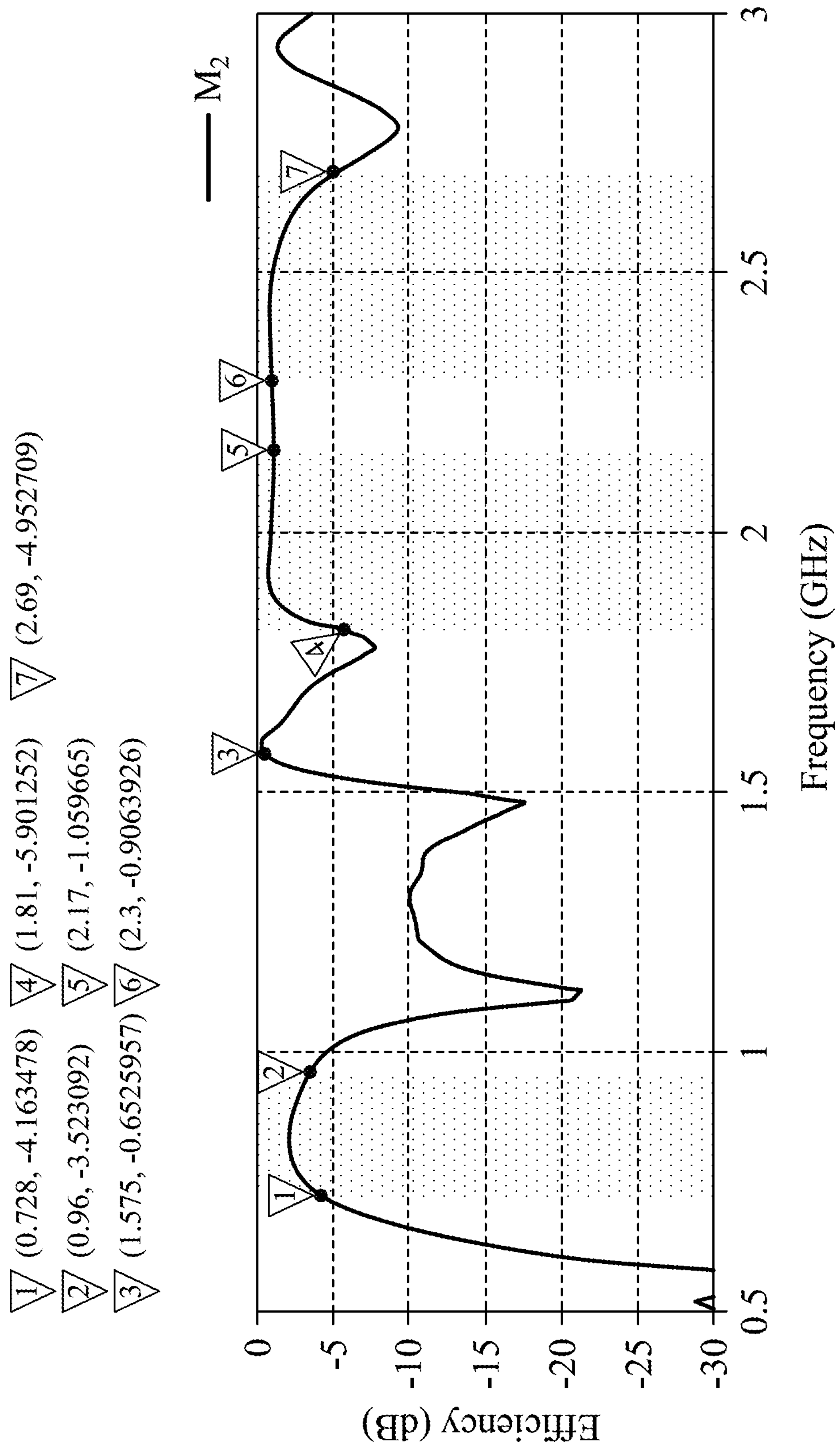
FIG. 8 shows a schematic graph illustrating the performance of the composite antenna of FIG. 1.

Please refer to FIGS. 7 and 8. FIG. 7 shows a schematic graph illustrating S-parameter of the composite antenna 100 of FIG. 1. FIG. 8 shows a schematic graph illustrating the performance of the composite antenna 100 of FIG. 1. In FIG. 7, the horizontal axis represents frequency (GHz), and the vertical axis represents S-parameters (dB). A curve $M_1$ is a reflection coefficient (S11) of the composite antenna 100 as a function of the operating frequency, the reflection coefficient of the center frequency (1.575 GHZ) of the first frequency band is less than −20 dB, the reflection coefficient of the second frequency band (2.3 GHZ to 2.69 GHz) is less than −3 dB, the reflection coefficient of the third frequency band (1.81 GHz to 2.17 GHz) is less than −3 dB, and the reflection coefficient of the fourth frequency band (0.728 GHz to 0.96 GHz) is less than −3 dB. Therefore, the composite antenna 100 of the present disclosure has the good reflection coefficient in both of the low-frequency operating frequency band and the high-frequency operating frequency band. In FIG. 8, the horizontal axis represents frequency (GHz), and the vertical axis represents efficiency (dB). A curve $M_2$ is the antenna efficiency of the composite antenna 100 as a function of the operating frequency. In the first to fourth frequency bands, the antenna efficiency of the composite antenna 100 can be maintained within −6 dB, which can meet the practical application requirements of the general multi-input and multi-output antenna systems. Thus, the composite antenna 100 of the present disclosure can be divided into two different antenna forms, one is the first antenna structure 300 (e.g., the GPS antenna) disposed on the substrate 200, and the other is the second antenna structure 600 disposed on the antenna holder 500 (e.g., the WWAN Aux antenna). Both of the first antenna structure 300 and the second antenna structure 600 share the feeding point F and the grounding point G, so there is no isolation problem.

Figure 9:
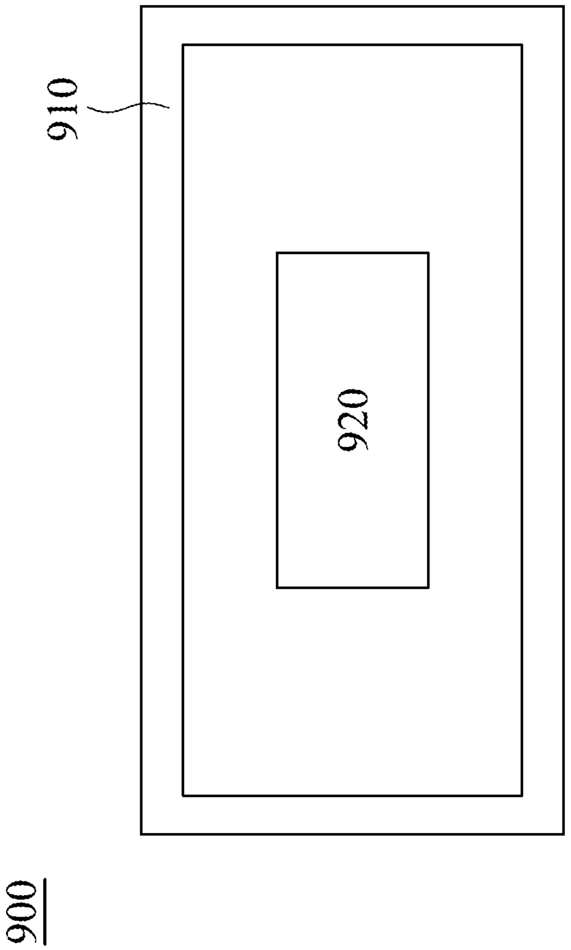
FIG. 9 shows a schematic view of an electronic device according to a second embodiment of the present disclosure.

Please refer to FIG. 9. FIG. 9 shows a schematic view of an electronic device 900 according to a second embodiment of the present disclosure. As shown in FIG. 9, the electronic device 900 at least includes a housing 910 and a composite antenna 920. The composite antenna 920 is disposed on the housing 910. Specifically, the electronic device 900 can be a mobile electronic device, such as a smart phone, a tablet computer, or a notebook computer. The housing 910 can be at least partially made of a non-conductive material so as to transmit the electromagnetic waves of the composite antenna 920. For example, the composite antenna 920 can be the composite antenna 100 of the first embodiment in FIG. 1, and its structure and function will not be described here again. Although not shown in FIG. 9, the electronic device 900 can further include a system mainboard and other environmental components, such as a processor, a storage device, a speaker, a battery module or/and a touch control panel, and the substrate of the composite antenna 920 is a part of the system motherboard of the electronic device 900.

In summary, the present disclosure has the following advantages. First, the composite antenna of the present disclosure has a simple structure and is easy to assemble. Since the antenna holder can be combined with the printed circuit board (i.e., the substrate), the overall operating frequency band is highly variable, and the configuration of the antenna structure can be changed on the antenna holder according to different products or client requirements. Second, by arranging the first antenna structure and the second antenna structure in the same antenna clearance area, it can effectively save space and expand the antenna frequency band. Third, if the product or client does not need to use multiple frequency bands, the radiator can be simply printed on the substrate of the composite antenna, so it has a zero-cost advantage.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A composite antenna, comprising:

a substrate;

a first antenna structure disposed on the substrate, wherein two ends of the first antenna structure are coupled to a feeding point and a grounding point, respectively;

two contact springs disposed on the first antenna structure and electrically connected to the feeding point and the grounding point, respectively;

an antenna holder removably disposed on the substrate; and a second antenna structure disposed on the antenna holder and electrically connected to the two contact springs.

2. The composite antenna of claim 1, wherein the first antenna structure comprises:

a feeding portion electrically connected to the feeding point;

a grounding portion electrically connected to the grounding point and parallel to the feeding portion, wherein the grounding portion is spaced apart from the feeding portion; and a radiating portion formed in a ring shape, wherein two ends of the radiating portion are connected to the feeding portion and the grounding portion, respectively.

3. The composite antenna of claim 2, wherein the radiating portion operates in a first frequency band, and a center frequency of the first frequency band is 1.575 GHz.

4. The composite antenna of claim 1, wherein the antenna holder comprises:

a main frame body, comprising:

an outward convex arc portion;

an extending portion connected to the outward convex arc portion and formed in a planar shape, wherein the extending portion is perpendicular to the substrate; and a side portion connected to the outward convex arc portion and the extending portion and perpendicular to the substrate; and a sub-frame body connected between the outward convex arc portion and the extending portion, and located between the substrate and the outward convex arc portion.

5. The composite antenna of claim 4, wherein the outward convex arc portion comprises two through holes, and the composite antenna further comprises:

two conductive elements disposed on the sub-frame body, wherein two ends of the two conductive elements respectively pass through the two through holes to be connected to the second antenna structure, and another two ends of the two conductive elements are abutted by the two contact springs, respectively.

6. The composite antenna of claim 4, wherein the second antenna structure comprises:

a first radiator disposed on the outward convex arc portion of the main frame body, and comprising:

an extended feeding portion electrically connected to the feeding point through one of the two contact springs; and a high-frequency resonance portion connected to the extended feeding portion and operating in a second frequency band.

7. The composite antenna of claim 4, wherein the second antenna structure comprises:

a second radiator, comprising:

an extended grounding portion disposed on the outward convex arc portion of the main frame body and electrically connected to the grounding point through one of the two contact springs;

an intermediate-frequency resonance portion comprising:

a first segment disposed on the extending portion of the main frame body and connected to the extended grounding portion, wherein the first segment operates in a third frequency band; and a second segment disposed on the outward convex arc portion of the main frame body and connected to the first segment; and a low-frequency resonance portion disposed on the side portion of the main frame body and connected to the second segment, wherein the low-frequency resonance portion operates in a fourth frequency band.

8. The composite antenna of claim 1, wherein the second antenna structure operates in a second frequency band, a third frequency band and a fourth frequency band, the second frequency band is between 2300 MHz and 2690 MHz, the third frequency band is between 1810 MHz and 2170 MHz, and the fourth frequency band is between 728 MHz and 960 MHz.

9. The composite antenna of claim 1, wherein the first antenna structure is a loop antenna, and the second antenna structure is a dipole antenna.

10. An electronic device, comprising:

at least one of the composite antenna of claim 1.

11. An electronic device, comprising:

at least one of the composite antenna of claim 2.

12. An electronic device, comprising:

at least one of the composite antenna of claim 3.

13. An electronic device, comprising:

at least one of the composite antenna of claim 4.

14. An electronic device, comprising:

at least one of the composite antenna of claim 5.

15. An electronic device, comprising:

at least one of the composite antenna of claim 6.

16. An electronic device, comprising:

at least one of the composite antenna of claim 7.

17. An electronic device, comprising:

at least one of the composite antenna of claim 8.

18. An electronic device, comprising:

at least one of the composite antenna of claim 9.

* * * * *